(12) United States Patent
Nelson

(10) Patent No.: US 12,729,982 B2
(45) Date of Patent: Sep. 8, 2026

(54) UTILITY METER TRANSPARENT COLORED NAMEPLATE

(71) Applicant: Itron, Inc., Liberty Lake, WA (US)

(72) Inventor: Kirby Kimble Nelson, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 279 days.

(21) Appl. No.: 18/622,210

(22) Filed: Mar. 29, 2024

(65) Prior Publication Data

US 2024/0377226 A1 Nov. 14, 2024

Related U.S. Application Data

(60) Provisional application No. 63/501,292, filed on May 10, 2023.

(51) Int. Cl.
*G01D 4/02* (2006.01)
*G09F 3/10* (2006.01)

(52) U.S. Cl.
CPC ................ *G01D 4/02* (2013.01); *G09F 3/10* (2013.01)

(58) Field of Classification Search
CPC ... G09F 3/10; G09F 3/18; G09F 3/185; G09F 3/201; G09F 13/0413; G09F 13/0456; G09F 2013/1872; G09F 3/04; G09F 13/0409; G09F 13/08; G09F 13/10; G01D 4/02; G01D 11/24; G01D 11/245; G01N 2223/61; G01N 2291/0237; G01N 2201/022; G01N 2035/00306
USPC ....... 73/431, 273, 866.3, 864.34; 340/870.02
See application file for complete search history.

(56) References Cited

U.S. PATENT DOCUMENTS

| | | | | |
|---|---|---|---|---|
| 4,212,262 | A | 7/1980 | Gorrell | |
| 6,304,231 | B1 * | 10/2001 | Reed | G01D 4/006 343/702 |
| 7,800,890 | B1 | 9/2010 | Therrien et al. | |
| 2011/0261524 | A1 * | 10/2011 | Wieder | B29C 45/17 361/679.31 |
| 2019/0250010 | A1 | 8/2019 | Banhegyesi et al. | |

FOREIGN PATENT DOCUMENTS

| | | | |
|---|---|---|---|
| CN | 101738518 | A | 6/2010 |
| CN | 105486897 | A | 4/2016 |
| CN | 205201955 | U | 5/2016 |
| CN | 205246728 | U | 5/2016 |
| CN | 207703913 | U | 8/2018 |
| CN | 214621343 | U | 11/2021 |
| CN | 218002614 | U | 12/2022 |

(Continued)

OTHER PUBLICATIONS

Search Report and Written Opinion for International Application No. PCT/US2024/025218, Dated Jun. 25, 2024, 14 pages.

*Primary Examiner* — John E Breene
*Assistant Examiner* — Truong D Phan
(74) *Attorney, Agent, or Firm* — Lee & Hayes, P.C.

(57) ABSTRACT

A utility meter comprising an inner cover for covering an interior of the utility meter. The inner cover comprising a plate, one or more characters disposed on a front surface of the plate, and one or more attachment mechanisms disposed in or on the front surface of the plate. A transparent color film is removably attached to the plate over the one or more characters via the one or more attachment mechanisms disposed on the front surface of the plate.

18 Claims, 6 Drawing Sheets

(56) References Cited

FOREIGN PATENT DOCUMENTS

| | | | |
|---|---|---|---|
| DE | 2407207 | A1 | 8/1975 |
| DE | 4219527 | A1 | 10/1992 |
| JP | 2016045111 | A | 4/2016 |

* cited by examiner

UTILITY METER TRANSPARENT COLORED NAMEPLATE

BACKGROUND

Utility companies provide electricity, gas, water, oil, and/or other consumables or services (e.g., sewer, etc.) to consumers. A utility technology company may offer utility meters associated with the consumables and/or services over a considerable geographic area and to a large number of customers. The customers may require color options to differentiate the utility meters. In one example, the customers may require some information to reside in a colored field. In another example, the customers may require information to reside outside of a colored field. However, existing methods of providing customers with colored options use expensive color ink options that include information (e.g., serial numbers, ratings, logos, etc.) preprinted onto adhesive labels, for example. Moreover, these colored adhesive labels require a technician to peel the adhesive label from a substrate, adhere the adhesive label to a nameplate of the utility meter, and apply pressure to the adhesive label, which is labor intensive and susceptible to quality defects (e.g., mislabeled information, incorrect adhesion location, improper adhesion, misalignment, etc.). Errors in printing the information on the adhesive label, or placing the label on the meter result in a relatively high scrap rate and rework costs. For example, the utility meter may need to be disassembled to access the adhesive label needing to be removed from the nameplate, the adhesive label may not be easily removed from the nameplate, the adhesive residue may not be easily removed from the nameplate, etc. Thus, while utility meter nameplates may provide colored fields for customers to differentiate utility meters, errors in printing and/or applying the colored adhesive labels results in a relatively high scrap rate and rework costs. Moreover, because the colored adhesive labels involve expensive inks and expensive adhesive labels, and a labor-intensive manual application process, the use of colored adhesive labels increases the cost of the utility meter. Therefore, there remains a need for nameplates that are relatively less labor intensive to manufacture and less expensive to manufacture.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
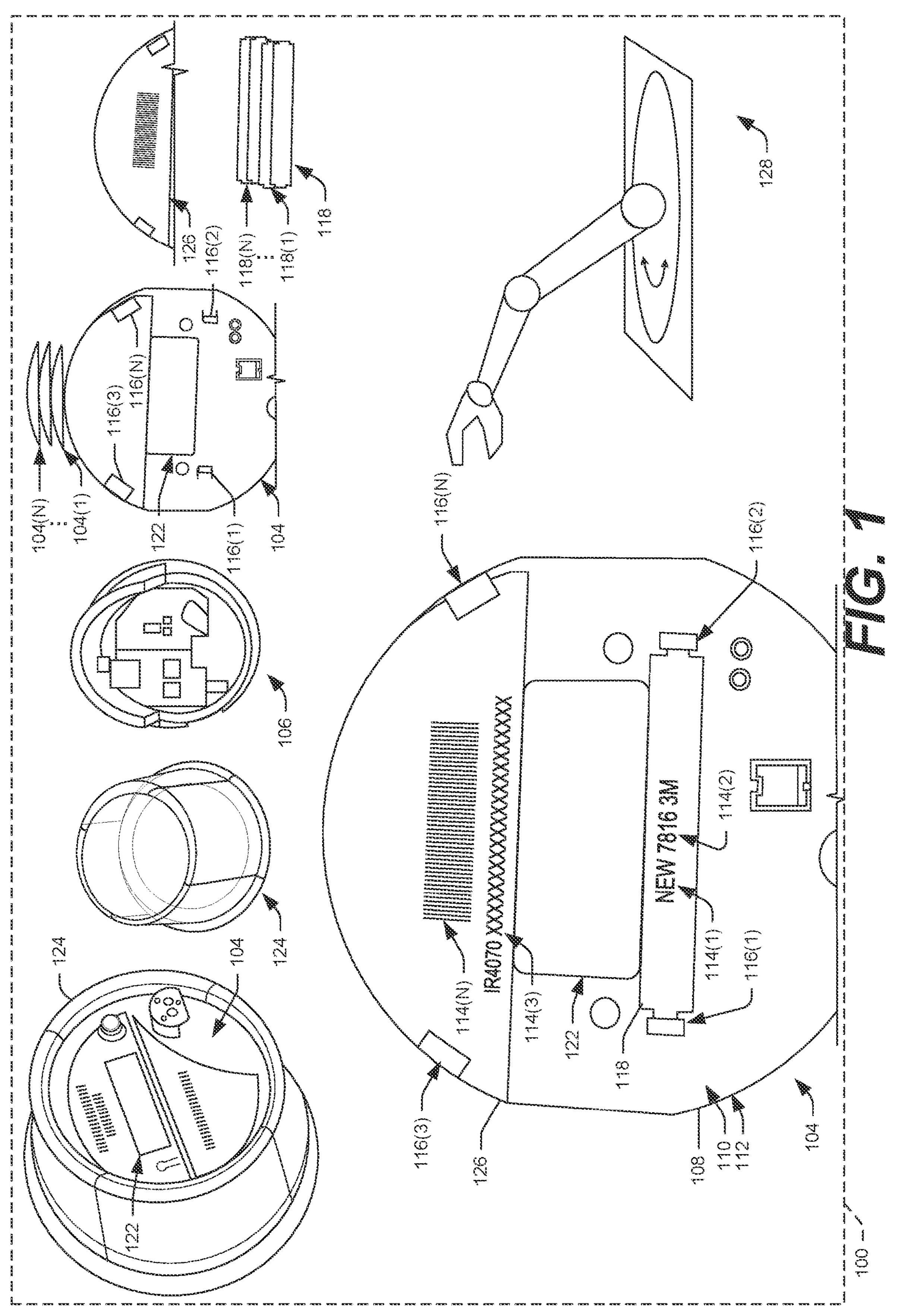
FIG. 1 illustrates a schematic diagram showing an example manufacturing system for manufacturing a utility meter according to an example in this disclosure.

As discussed above, utility technology companies manufacture utility meters for customers that include color options to differentiate between different types of utility meters, different utility service areas, different classes of customers (e.g., commercial vs. residential), or other characteristics. However, existing utility meters use expensive colored adhesive labels adhered to nameplates that are relatively labor-intensive and expensive to manufacture. Thus, the resulting utility meters are expensive to manufacture. The process of manufacturing and assembling the conventional utility meters is also susceptible to error and/or defects in application of the adhesive labels, reducing the quality and repeatability of meters made using the conventional processes.

This application describes utility meters and methods of making the utility meters that provide users (e.g., utility companies that provide resources such as electricity, water, gas, oil, etc. to residential or commercial customers) with color options to differentiate the utility meters that are relatively less labor intensive and/or relatively less expensive to manufacture. In an example, a user may order a plurality of utility meters having information (serial numbers, ratings, logos, names, descriptions, etc.) displayed on a surface of an inner cover (e.g., a nameplate) having some of the information in a colored field and/or some of the information outside of a colored field. When manufacturing the utility meters, a transparent color film may be disposed over at least a portion of the information and attached to one or more attachment mechanisms disposed in or on a front surface of the inner cover. Because the utility meters utilize transparent color film that is attached to one or more attachment mechanisms disposed in or on a front surface of the inner cover, the resulting utility meters are relatively less labor intensive and less expensive to manufacture as compared to utility meters utilizing colored adhesive labels. Additionally, in some examples, the transparent color film may be removably attached to the inner cover so that it can be removed, replaced, and/or repositioned any number of times.

In an example, one or more errors, inconsistencies, and/or defects associated with the information and/or the transparent color film may be discovered. Because the utility meters can utilize transparent color film that is removably attached to one or more attachment mechanisms disposed in or on a front surface of the inner cover, the discovered defects are relatively less labor intensive and inexpensive to correct as compared to utility meters utilizing colored adhesive labels.

The transparent color films can be efficiently cut (e.g., die-cut, laser cut, water jet cut, etc.) and/or molded (e.g., compression molded, melt molded, transfer molded, injection molded, etc.). Further, the manufacturing of the transparent color films and/or the application of the transparent color films to the meters can be efficiently automated throughout a supply chain. The transparent color films can be used in combination with laser printing, laser etching, printing, etc., on a front surface of the inner cover. Additionally or alternatively, transparent color films can be used in combination with colored and/or non-colored adhesive labels on a front surface of the inner cover. The transparent color films can be combined in multiple layers (e.g., multiple transparent film layers and/or multiple opaque film layers) to provide broader display options (e.g., different color options obtained by combing two or more transparent colored films, or combining one or more transparent colored films with an underlying opaque colored film).

The discussion herein includes several sections. Each section is intended to be an example of techniques and/or structures, but is not intended to indicate elements which must be used and/or performed. A section entitled "Example System and Techniques" discusses example structures and implementations that produce utility meters utilizing transparent color films. Additionally, the example structures may perform automation to produce utility meters utilizing transparent color films. A section entitled "Example Methods" discusses aspects of methods operational in devices including processors, memory devices, application specific integrated circuits (ASICs), etc. In particular, the example methods may be applied to any of the techniques discussed herein, including those of the following sections.

Example System and Techniques

FIG. 1 illustrates a schematic diagram showing an example manufacturing system 100 for manufacturing a utility meter 102 according to an example in this disclosure. In some examples, the manufacturing system 100 may be operated by a utility technology company.

The utility meter 102 may comprise a cover. In some examples the cover is an inner cover 104 for covering an interior 106 of the utility meter 102. The inner cover 104 may include a plate 108. The plate 108 may have a front surface 110 opposite a back surface 112. The plate 108 may include a plastic, a metal, a ceramic, a composite, etc.

In an example, one or more characters 114(1), 114(2), 114(3) . . . 114(N) are disposed on the front surface 110 of the plate 108. In an example, one or more of the one or more characters 114(1)-114(N) are laser printed on the front surface 110 of the plate 108. In another example, one or more of the characters 114(1)-114(N) may be printed (e.g., laser printed, ink jet printed, etc.) on the front surface 110 of the plate 108. In another example, one or more of the characters 114(1)-114(N) may be printed on a label that is adhered to the front surface 110 of the plate 108.

In an example, one or more attachment mechanisms 116(1), 116(2), 116(3) . . . 116(N) may be disposed in or on the front surface 110 of the plate 108 to allow attachment of an indicator to the plate 108. FIG. 1 illustrates an example in which the indicator comprises a transparent color film 118 attached to the plate 108 over the one or more characters 114(1) and 114(2). The transparent color film 118 being attached to the plate 108 via the one or more attachment mechanisms 116(1) and 116(2). In an example, the one or more attachment mechanisms 116(1) and 116(2) comprises a pair of slots disposed in the plate 108 and the transparent color film 118 comprises portions sized to be received in the slots disposed in the plate 108. In an example, the transparent color film 118 comprises at least one of a rectangular strip or a circular dot. In an example, the transparent color film 118 comprises one or more characters disposed on a surface of the transparent color film.

FIG. 1 illustrates an example in which the inner cover 104 further comprises a digital display 120. The digital display 120 in this example is disposed in an opening 122 disposed in the front surface 110 of the plate 108.

FIG. 1 illustrates the utility meter 102 further comprising a transparent outer cover 124. The transparent outer cover 124 covering the inner cover 104. In some examples, transparent color film 118 may be coupled to an inner surface of the outer cover 124 in addition to or instead of being coupled to the plate 108 of the inner cover 104.

FIG. 1 illustrates a second transparent color film 126 may be attached to the plate 108 over the one or more characters 114(3) and 114(N). The second transparent color film 126 being attached to the plate 108 via the one or more attachment mechanisms 116(3) and 116(N). Similar to the one or more attachment mechanisms 116(1) and 116(2), the one or more attachment mechanisms 116(3) and 116(N) comprise a pair of slots disposed in the plate 108 and the second transparent color film 126 comprises portions sized to be received in the slots disposed in the plate 108. In an example, the transparent color film 118 includes a first color and the second transparent color film 126 includes a second color different than the first color. For example, a customer ordering the utility meter may specify that the first color of the transparent color film 118 cover the one or more characters 114(1) and 114(2) and the second color of the second transparent color film 126 cover the other one or more characters 114(3) and 114(N). While FIG. 1 illustrates the plate 108 including two different colored transparent color films covering two different portions of the plate 108, any number of different colored transparent color films may cover the same portion or different portions of the plate 108 and/or other surfaces (e.g., plate, circumferential side walls, etc.) of the inner cover 104 and/or outer cover 124, which surfaces may or may not include one or more characters.

FIG. 1 illustrates an example in which the system may include a robotic mechanism 128. The robotic mechanism 128 may be communicatively coupled to one or more computing devices including one or more processors, where one or more non-transitory computer readable media storing computer-executable instructions that, when executed on the one or more processors, cause the robotic mechanism 128 to perform actions in order to manufacture the utility meter 102. The robotic mechanism 128 may include one or more robotic arms, conveyors, pick and place mechanisms. The system 100 and/or the robotic mechanism 128 may include one or more scanners, cameras, or other computer vision and/or machine vision systems and/or components to monitor position of the meter and its various components during manufacturing and assembly and/or provide feedback to orient the robotic mechanism relative to the work space and the meter being worked on. In an example, the robotic mechanism comprises at least one of a robotic arm, a conveyor, or a pick and place machine. In an example, the robotic mechanism comprises a robotic arm having a picking attachment to pick the transparent color film. In an example, the picking mechanism can include a manipulator with tacky or vacuum elements to "grasp" and manipulate the transparent colored film. In an example, the robotic mechanism 128 may be caused to perform an action comprising obtaining the inner cover 104 from a plurality of inner covers 104(1)-104(N). For example, the robotic mechanism 128 may be caused to obtain the inner cover 104 from the plurality of inner covers 104(1)-104(N) disposed in a stack, a magazine stack, a bin, a cell, etc. In another example, the robotic mechanism 128 may be caused to obtain the inner cover 104 from a plurality of inner covers 104(1)-104(N) disposed on an assembly line.

In an example, the robotic mechanism 128 may be caused to perform an action comprising obtaining the transparent color film 118 from a plurality of transparent color films 118(1)-118(N). For example, the robotic mechanism 128 may be caused to obtain the transparent color film 118 from the plurality of transparent color films 118(1)-118(N) disposed in a stack, a magazine stack, a bin, a cell, etc. In an example, a supplier may provide the plurality of transparent color films 118(1)-118(N) in a magazine stack for robotic placement. In an example, the robotic mechanism 128 may attach the transparent color film 118 to the plate 108. For example, the robotic mechanism 128 may deform the transparent color film 118 from a first state, where the transparent color film 118 has a planar shape, to a second state, where the transparent color film 118 has a curvilinear shape, and insert at least a portion of the transparent color film 118 into an attachment mechanism (e.g., attachment mechanism 116

(1)) of the one or more attachment mechanisms 116(1)-116(N). The transparent color film 118 may be allowed to relax back into the first state such that the transparent color film 118 covers the one or more characters (e.g., one or more characters 114(1) and 114 2)) such that the one or more characters are visible through the transparent color film 118.

Example Methods

FIGS. 2A-2E illustrate a block diagram showing an example process 200 for manufacturing the utility meter 102 of FIG. 1 according to an example in this disclosure. In some examples, at least a portion of this process may be performed at a utility technology company. In some examples, at least a portion of this process may be performed by a user or customer (e.g., a utility resource providing company) after the meter leaves a manufacturing facility and/or after the meter is installed. The operations of the example process are illustrated in individual blocks and summarized with reference to those blocks. The process is illustrated as a logical flow of blocks, each block of which can represent one or more operations that can be implemented in hardware, software, or a combination thereof. In the context of software, the operations represent computer-executable instructions stored on one or more non-transitory computer-readable storage media that, when executed by one or more processors, enable the one or more processors to perform the recited operations. Generally, computer-executable instructions include routines, programs, objects, modules, components, data structures, and the like that perform particular functions or implement particular abstract data types. Note that the order in which the processes are described is not intended to be construed as a limitation, and any number of the described operations can be executed in any order, combined in any order, subdivided into multiple sub-operations, and/or executed in parallel to implement the described process. Additionally, individual blocks may be deleted from the processes without departing from the spirit and scope of the subject matter described herein.

Figure 2A:
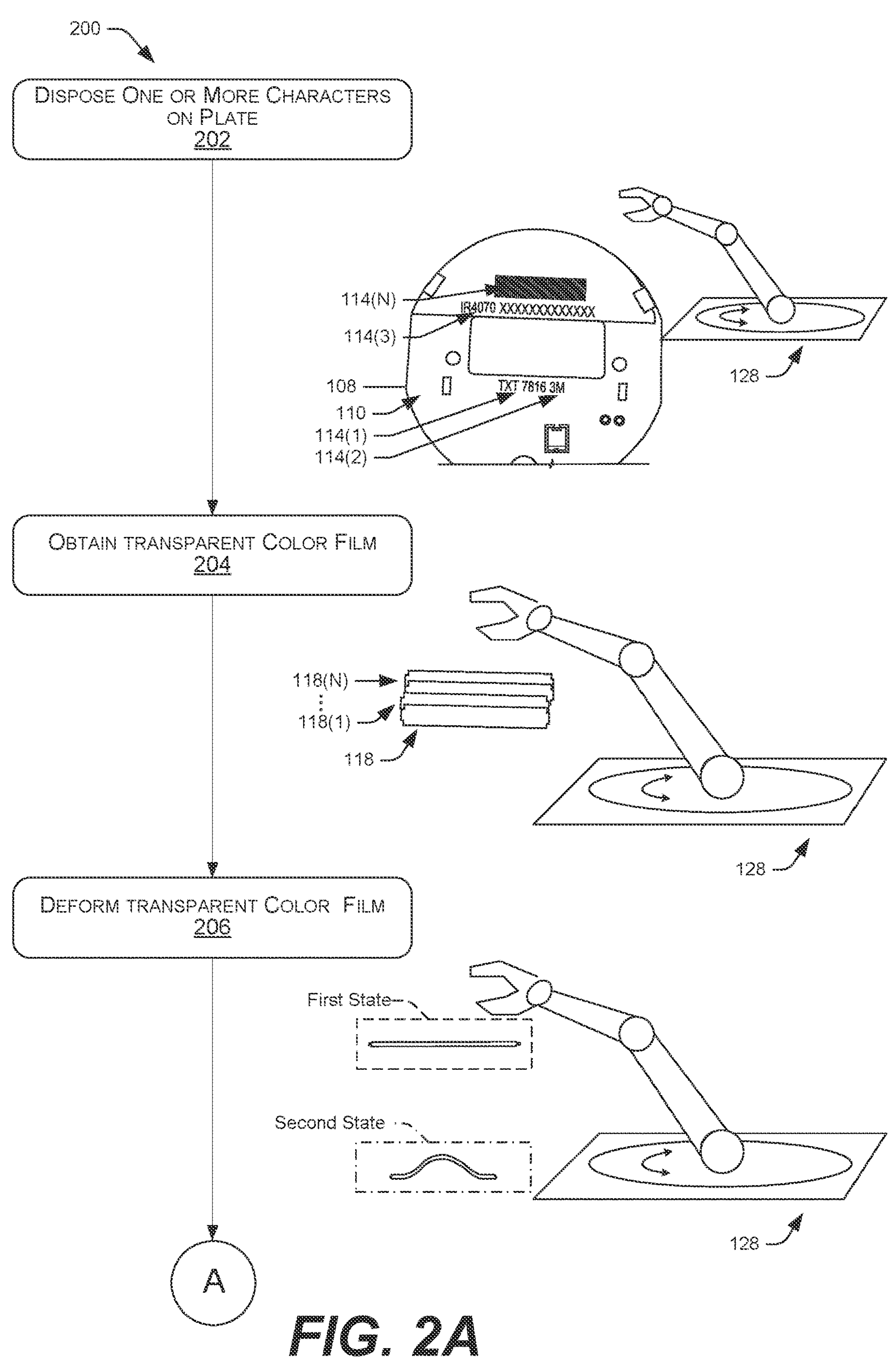
FIGS. 2A-2E illustrate a block diagram showing an example process for manufacturing a utility meter such as the utility meter of FIG. 1 according to an example in this disclosure.

Beginning with FIG. 2A, process 200 includes, at operation 202, disposing one or more characters (one or more characters 114(1)-114(N)) on a front surface (front surface 110) of a plate (plate 108) of an inner cover (inner cover 104). In an example, a robotic mechanism (robotic mechanism 128) may dispose the one or more characters on the front surface via laser etching the one or more characters directly onto the plate. In another example, the robotic mechanism may dispose the one or more characters on the front surface via laser printing the one or more characters directly onto the plate. In another example, the robotic mechanism may dispose the one or more characters on the front surface via printing (e.g., inkjet printing) the one or more characters directly onto the plate. In still other examples, the robotic mechanism may dispose the one or more characters on the front surface via printing (e.g., laser and/or inkjet printing) the one or more characters onto an adhesive label and applying the label to the plate.

Process 200 includes operation 204, which represents obtaining a transparent color film (transparent color film 118) from a plurality of transparent color films (plurality of transparent color film 118(1)-118(N)) for attachment to the plate over the one or more characters. As discussed above, the plurality of transparent color films may be disposed in a stack (e.g., magazine stack) for robotic placement. In an example, the robotic mechanism may obtain the transparent color film from the plurality of transparent color films from the stack for attachment to the plate over the one or more characters.

Process 200 includes operation 206, which represents deforming the transparent color film from a first state to a second state. As discussed above, the transparent color film is deformable between a first state and a second state. When in the first state, the transparent color film has a planar shape. When in the second state, the transparent color film has a curvilinear shape. In an example, the robotic mechanism may deform the transparent color film from the first state to the second state.

Figure 2B:
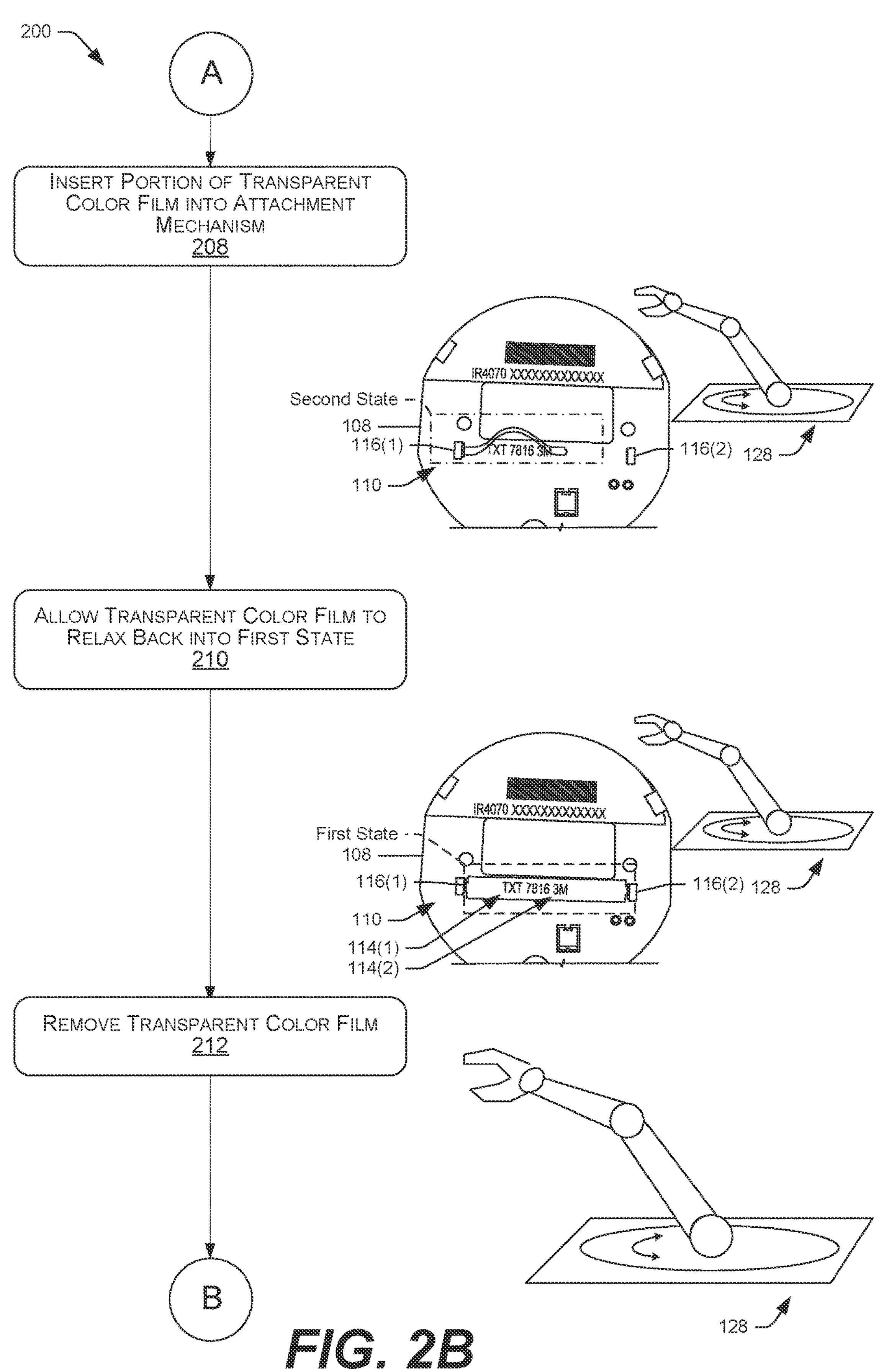

Continuing at FIG. 2B, process 200 includes operation 208, which represents inserting the transparent color film into an attachment mechanism (attachment mechanism 116(1)) of the one or more attachment mechanisms (one or more attachment mechanisms 116(1)-116(N)). In an example, the robotic mechanism may insert at least a portion of the transparent color film into the attachment mechanism of the one or more attachment mechanisms. For example, the robotic mechanism may insert a portion of the transparent color film into a slot disposed in the plate. For example, and as discussed above, the attachment mechanism may comprise a slot disposed in the plate and the transparent color film comprises a portion sized to be received in the slot. The robotic mechanism may insert the portion into the slot.

Process 200 includes operation 210, which represents allowing the transparent color film to relax back into the first state. In an example, the robotic mechanism may allow the transparent color film to relax back into the first state, such that the transparent color film covers the one or more characters, such that the one or more characters are visible through the transparent color film. In an example, the robotic mechanism may allow the transparent color film to relax back into the first state, such that a second portion of the transparent color film is inserted into a second slot disposed in the plate. For example, and as discussed above, the one or more attachment mechanisms may comprise a pair of slots disposed in the plate and the transparent color film may comprise portions sized to be received in the pair of slots disposed in the plate. The robotic mechanism may allow the transparent color film to relax back into the first state, such that the other portion of the transparent color film is inserted into the other slot of the pair of slots.

Process 200 includes operation 212, which represents removing the transparent color film from the attachment mechanism of the one or more attachment mechanisms. For example, the one or more characters under the transparent color film may include a quality defect (e.g., mislabeled information, inadequate characters, etc.), and the transparent color film may be removed to correct the one or more characters. The subsequent steps are optional and, in some examples, may be performed by the customer (e.g., utility company) rather than the meter manufacturer.

Figure 2C:
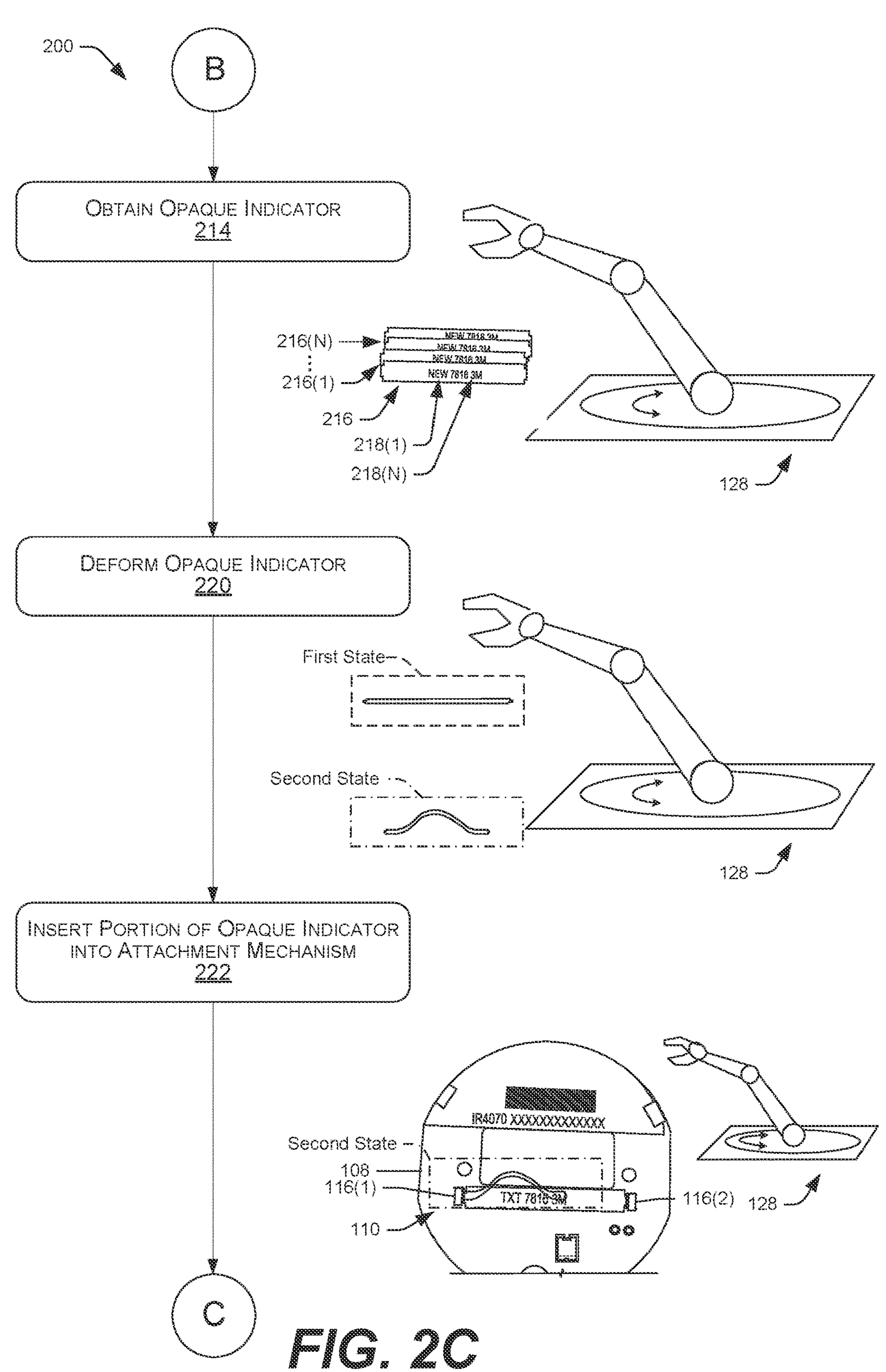

Continuing with FIG. 2C, process 200 includes operation 214, which represents obtaining an opaque indicator 216, from a plurality of opaque indicators 216(1)-216(N), for attachment to the plate. For example, the robotic mechanism may obtain the opaque indicator 216 to cover the one or more characters, such that the one or more characters are not visible through the opaque indicator 216. In an example, and similar to the transparent color film, the opaque indicator 216 is deformable between the first state and the second state. In an example, the opaque indicator 216 includes one or more correct characters 218(1) and 218(N). In an example, the opaque indicator 216 is at least one of complimentary in shape and/or size to the transparent color film.

Process 200 includes operation 220, which represents deforming the opaque indicator 216 from the first state to the second state. In an example, the robotic mechanism may deform the opaque indicator 216 from the first state to the second state.

Process 200 includes operation 222, which represents inserting the opaque indicator 216 into the attachment mechanism. In an example, and similar to the transparent color film, the robotic mechanism may insert at least a portion of the opaque indicator 216 into the attachment mechanism of the one or more attachment mechanisms. For example, the robotic mechanism may insert a portion of the opaque indicator 216 into a slot disposed in the plate. For example, the attachment mechanism may comprise a slot disposed in the plate and the opaque indicator 216 comprises a portion sized to be received in the slot. The robotic mechanism may insert the portion into the slot.

Figure 2D:
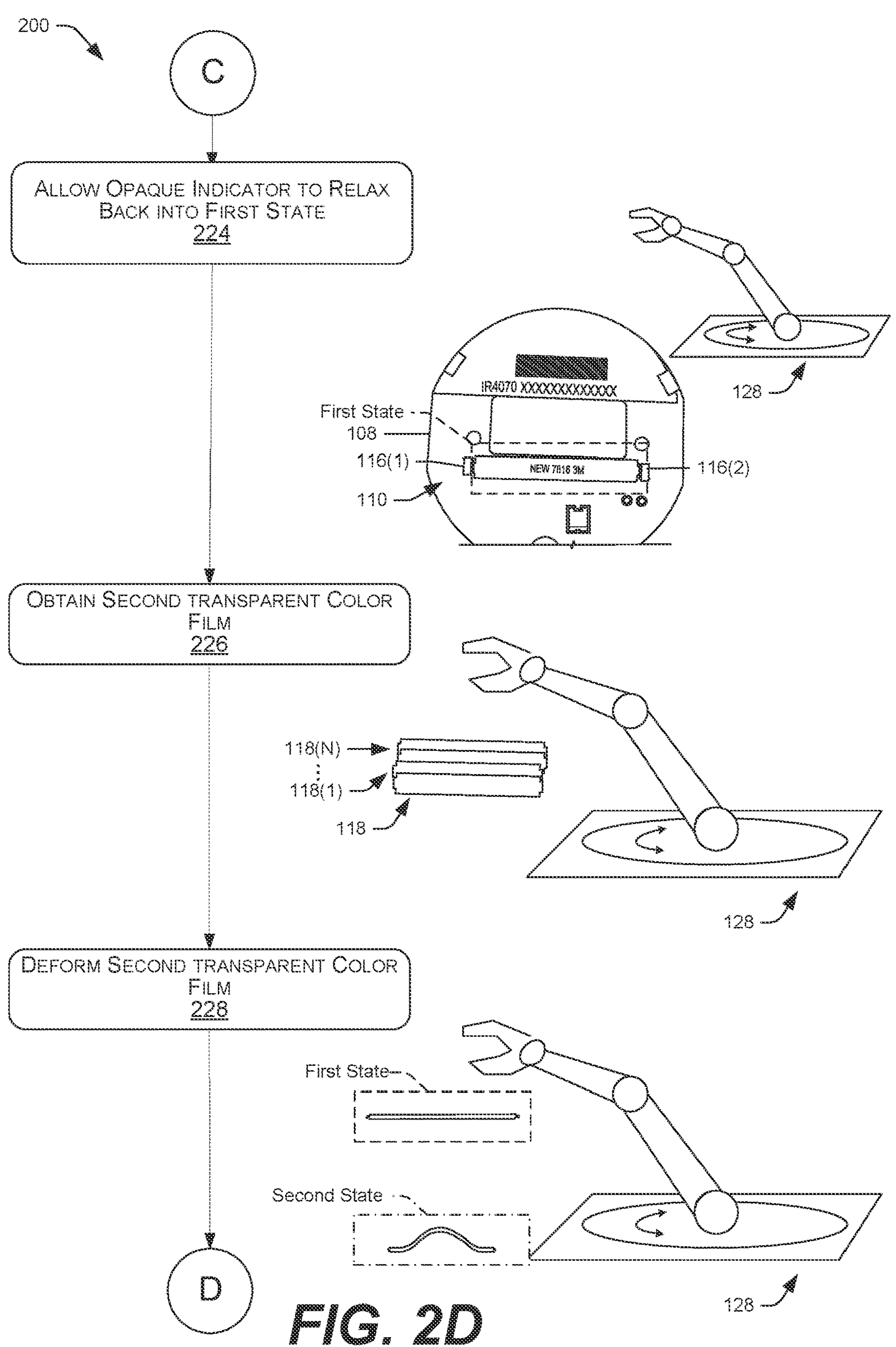

Continuing with FIG. 2D, process 200 includes operation 224, which represents allowing the opaque indicator 216 to relax back into the first state. In an example, the robotic mechanism may allow the opaque indicator 216 to relax back into the first state, such that the opaque indicator 216 covers the one or more characters, such that the one or more characters are not visible through the opaque indicator 216. In an example, the robotic mechanism may allow the opaque indicator 216 to relax back into the first state, such that a second portion of the opaque indicator 216 is inserted into a second slot disposed in the plate. For example, and as discussed above, the one or more attachment mechanisms may comprise a pair of slots disposed in the plate and the opaque indicator 216 may comprise portions sized to be received in the pair of slots disposed in the plate. The robotic mechanism may allow the opaque indicator 216 to relax back into the first state, such that the other portion of the opaque indicator 216 is inserted into the other slot of the pair of slots.

Process 200 includes operation 226, which represents obtaining a second transparent color film for attachment to the plate over the opaque indicator 216. In an example, the second transparent color film may be the same transparent color film (e.g., transparent color film 118) that was removed at operation 212. In another example, the second transparent color film may be another one of the plurality of transparent color films 118(1)-118(N). In another example, the second transparent color film may be different colored transparent colored film and/or a different shaped transparent colored film.

Process 200 includes operation 228, which represents deforming the second transparent color film from the first state to the second state. In an example, the robotic mechanism may deform the second transparent color film from the first state to the second state.

Figure 2E:
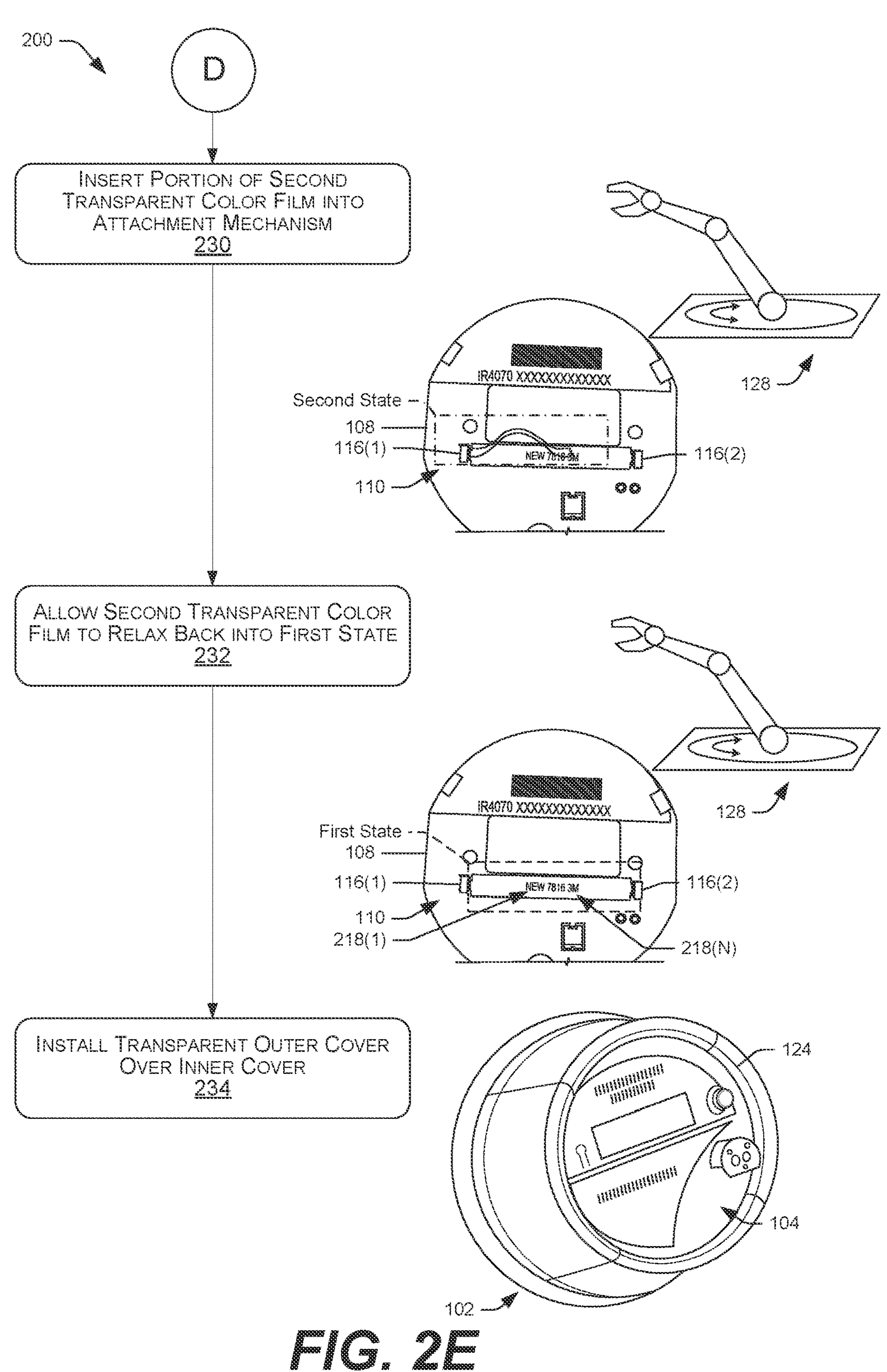

Continuing with FIG. 2E, process 200 includes operation 230, which represents inserting the second transparent color film into the attachment mechanism.

Process 200 includes operation 232, which represents allowing the second transparent color film to relax back into the first state. In an example, the robotic mechanism may allow the second transparent color film to relax back into the first state, such that the second transparent color film relaxes back into the first state such that the second transparent color film covers the one or more correct characters 218(1) and 218(N), such that the one or more correct characters 218(1) and 218(N) are visible through the second transparent color film.

Process 200 may be complete at operation 234, which represents installing a transparent outer cover (transparent outer cover 124) over the inner cover.

Example Clauses

A. A utility meter comprising: an inner cover for covering an interior of the utility meter, the inner cover comprising: a plate having a front surface opposite a back surface, one or more characters disposed on the front surface, and one or more attachment mechanisms disposed in or on the front surface; and a transparent color film attached to the plate over the one or more characters, the transparent color film being attached to the plate via the one or more attachment mechanisms.

B. A utility meter as paragraph A recites, the inner cover further comprising a digital display disposed in an opening disposed in the front surface of the plate.

C. A utility meter as paragraphs A or B recites, further comprising a transparent outer cover covering the inner cover.

D. A utility meter as any one of paragraphs A-C recites, wherein the one or more characters are laser printed on the front surface.

E. A utility meter as any one of paragraphs A-D recites, wherein the one or more characters are printed on a label that is adhered to the front surface.

F. A utility meter as any one of paragraphs A-E recites, wherein the one or more characters are printed on the front surface.

G. A utility meter as any one of paragraphs A-F recites, wherein the transparent color film comprises one or more characters disposed on a surface of the transparent color film.

H. A utility meter as any one of paragraphs A-G recites, further comprising an opaque indicator coupled to the plate via the one or more attachment mechanisms and disposed beneath the transparent color film.

I. A utility meter as any one of paragraphs A-H recites, wherein the transparent color film comprises at least one of a rectangular strip or a circular dot.

J. A utility meter as any one of paragraphs A-I recites, further comprising an opaque indicator coupled to the plate via the one or more attachment mechanisms and disposed beneath the transparent color film, and wherein the opaque indicator is at least one of complimentary in shape and/or size to the transparent color film.

K. A utility meter as any one of paragraphs A-J recites, wherein the one or more attachment mechanisms comprise a pair of slots disposed in the plate and the transparent color film comprises portions sized to be received in the pair of slots disposed in the plate.

L. A method of making a utility meter comprising: obtaining an inner cover for covering an interior of the utility meter, the inner cover comprising: a plate having a front surface opposite a back surface, one or more characters disposed on the front surface, and one or more attachment mechanisms disposed in or on the front surface; obtaining a transparent color film for attachment to the plate over the one or more characters, the transparent color film being deformable between a first state and a second state, wherein: when in the first state the transparent color film has a planar shape, and when in the second state the transparent color film has a curvilinear shape; deforming the transparent color film from the first state to the second state; inserting at least a portion of the transparent color film into an attachment mechanism of the one or more attachment mechanisms; and allowing the transparent color film to relax back into the first state such that the transparent color film covers the one or more characters, and such that the one or more characters are visible through the transparent color film.

M. A method as paragraph L recites, further comprising: removing the transparent color film from the attachment mechanism of the one or more attachment mechanisms; obtaining an opaque indicator for attachment to the plate over the one or more characters, the opaque indicator being deformable between the first state and the second state and including one or more correct characters; deforming the opaque indicator from the first state to the second state; inserting at least a portion of the opaque indicator into the attachment mechanism of the one or more attachment mechanisms; allowing the opaque indicator to relax back into the first state such that the opaque indicator covers the one or more characters, such that the one or more characters are not visible through the opaque indicator.

N. A method as paragraphs L or M recites, further comprising reinstalling the transparent color film over the opaque indicator.

O. A method as any one of paragraphs L through N recites, wherein the transparent color film is a first transparent color film, and the method further comprises: obtaining a second transparent color film for attachment to the plate over the opaque indicator, the second transparent color film being deformable between the first state and the second state; deforming the second transparent color film from the first state to the second state; inserting at least a portion of the second transparent color film into the attachment mechanism of the one or more attachment mechanisms; and allowing the second transparent color film to relax back into the first state such that the second transparent color film covers the one or more correct characters, such that the one or more correct characters are visible through the second transparent color film.

P. A method as any one of paragraphs L through O recites, wherein obtaining the inner cover comprises a robotic apparatus picking the inner cover from a plurality of inner covers.

Q. A method as any one of paragraphs L through P recites, wherein obtaining the transparent color film comprises a robotic apparatus picking the transparent color film from a plurality of transparent color films.

R. A method as any one of paragraphs L through Q recites, wherein the plurality of transparent color films are disposed in a magazine stack.

S. A method as any one of paragraphs L through R, wherein deforming the transparent color film comprises a robotic apparatus deforming the transparent color film from the first state to the second state.

T. A method as any one of paragraphs L through S recites, further comprising forming the one or more characters onto the front surface of the plate via at least one of laser engraving, printing, etching, or applying an adhesive label.

U. A method as any one of paragraphs L through T recites, the inner cover further comprising a digital display disposed in an opening disposed in the front surface of the plate.

V. A method as any one of paragraphs L through U recites, further comprising installing a transparent outer cover over the inner cover.

W. A system for making a utility meter, the system comprising: a robotic mechanism; one or more processors; and one or more non-transitory computer-readable media storing computer-executable instructions that, when executed by the one or more processors, cause the robotic mechanism communicatively coupled to the one or more processors to perform actions comprising: obtaining an inner cover from a plurality of inner covers, the inner cover for covering an interior of the utility meter and comprising: a plate having a front surface opposite a back surface, one or more characters disposed on the front surface, and one or more attachment mechanisms disposed in or on the front surface; obtaining a transparent color film from a plurality of transparent color films, the transparent color film for attachment to the plate over the one or more characters, the transparent color film being deformable between a first state and a second state, wherein: when in the first state the transparent color film has a planar shape, and when in the second state the transparent color film has a curvilinear shape; deforming the transparent color film from the first state to the second state; inserting, via the robotic mechanism, at least a portion of the transparent color film into an attachment mechanism of the one or more attachment mechanisms; and allowing the transparent color film to relax back into the first state such that the transparent color film covers the one or more characters, such that the one or more characters are visible through the transparent color film.

X. A system as paragraph W recites, the non-transitory computer-readable media further storing computer-executable instructions that, when executed by the one or more processors, cause the robotic mechanism to perform actions comprising: obtaining an opaque indicator for attachment to the plate over the one or more characters, the opaque indicator being deformable between the first state and the second state and including one or more correct characters; deforming the opaque indicator from the first state to the second state; inserting at least a portion of the opaque indicator into the attachment mechanism of the one or more attachment mechanisms; allowing the opaque indicator to relax back into the first state such that the opaque indicator covers the one or more characters, such that the one or more characters are not visible through the opaque indicator.

Y. A system as paragraph W or X recites, wherein the transparent color film is a first transparent color film, and the non-transitory computer-readable media further storing computer-executable instructions that, when executed by the one or more processors, cause the robotic mechanism to perform actions comprising: obtaining a second transparent color film for attachment to the plate over the opaque indicator, the second transparent color film being deformable between the first state and the second state; deforming the second transparent color film from the first state to the second state; inserting at least a portion of the second transparent color film into the attachment mechanism of the one or more attachment mechanisms; and allowing the second transparent color film to relax back into the first state such that the second transparent color film covers the one or more correct characters, such that the one or more correct characters are visible through the second transparent color film.

Z. A system as any one of paragraphs W through Y recites, wherein the plurality of transparent color films are disposed in a magazine stack.

AA. A system as any one of paragraphs W through Z recites, wherein the non-transitory computer-readable media storing computer-executable instructions that, when executed by the one or more processors, cause the robotic mechanism to perform actions comprising: forming the one or more characters onto the front surface of the plate via at least one of laser engraving, printing, etching, or applying an adhesive label.

BB. A system as any one of paragraphs W through AA recites, the inner cover further comprising a digital display disposed in an opening disposed in the front surface of the plate.

CC. A system as any one of paragraphs W through BB recites, further comprising installing a transparent outer cover over the inner cover.

DD. A system as any one of paragraphs W through CC recites, wherein the robotic mechanism comprises at least one of a robotic arm, a conveyor, or a pick and place machine.

EE. A system as any one of paragraphs W through DD recites, wherein the robotic mechanism comprises a robotic arm having a picking attachment to pick the transparent color film.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of making a utility meter comprising:

obtaining an inner cover for covering an interior of the utility meter, the inner cover comprising:

a plate having a front surface opposite a back surface, one or more characters disposed on the front surface, and one or more attachment mechanisms disposed in or on the front surface;

obtaining a transparent color film for attachment to the plate over the one or more characters, the transparent color film being deformable between a first state and a second state, wherein:

when in the first state the transparent color film has a planar shape, and when in the second state the transparent color film has a curvilinear shape;

deforming the transparent color film from the first state to the second state;

inserting at least a portion of the transparent color film into an attachment mechanism of the one or more attachment mechanisms; and allowing the transparent color film to relax back into the first state such that the transparent color film covers the one or more characters, and such that the one or more characters are visible through the transparent color film.

2. The method of claim 1, further comprising:

removing the transparent color film from the attachment mechanism of the one or more attachment mechanisms;

obtaining an opaque indicator for attachment to the plate over the one or more characters, the opaque indicator being deformable between the first state and the second state and including one or more correct characters;

deforming the opaque indicator from the first state to the second state;

inserting at least a portion of the opaque indicator into the attachment mechanism of the one or more attachment mechanisms;

allowing the opaque indicator to relax back into the first state such that the opaque indicator covers the one or more characters, such that the one or more characters are not visible through the opaque indicator.

3. The method of claim 2, further comprising reinstalling the transparent color film over the opaque indicator.

4. The method of claim 2, wherein the transparent color film is a first transparent color film, and the method further comprises:

obtaining a second transparent color film for attachment to the plate over the opaque indicator, the second transparent color film being deformable between the first state and the second state;

deforming the second transparent color film from the first state to the second state;

inserting at least a portion of the second transparent color film into the attachment mechanism of the one or more attachment mechanisms; and allowing the second transparent color film to relax back into the first state such that the second transparent color film covers the one or more correct characters, such that the one or more correct characters are visible through the second transparent color film.

5. The method of claim 1, wherein obtaining the inner cover comprises a robotic apparatus picking the inner cover from a plurality of inner covers.

6. The method of claim 1, wherein obtaining the transparent color film comprises a robotic apparatus picking the transparent color film from a plurality of transparent color films.

7. A system for making a utility meter, the system comprising:

a robotic mechanism;

one or more processors; and one or more non-transitory computer-readable media storing computer-executable instructions that, when executed by the one or more processors, cause the robotic mechanism communicatively coupled to the one or more processors to perform actions comprising:

obtaining an inner cover from a plurality of inner covers, the inner cover for covering an interior of the utility meter and comprising:

a plate having a front surface opposite a back surface, one or more characters disposed on the front surface, and one or more attachment mechanisms disposed in or on the front surface;

obtaining a transparent color film from a plurality of transparent color films, the transparent color film for attachment to the plate over the one or more characters, the transparent color film being deformable between a first state and a second state, wherein:

when in the first state the transparent color film has a planar shape, and when in the second state the transparent color film has a curvilinear shape;

deforming the transparent color film from the first state to the second state;

inserting, via the robotic mechanism, at least a portion of the transparent color film into an attachment mechanism of the one or more attachment mechanisms; and allowing the transparent color film to relax back into the first state such that the transparent color film covers the one or more characters, such that the one or more characters are visible through the transparent color film.

8. The system of claim 7, the non-transitory computer-readable media further storing computer-executable instructions that, when executed by the one or more processors, cause the robotic mechanism to perform actions comprising:

obtaining an opaque indicator for attachment to the plate over the one or more characters, the opaque indicator being deformable between the first state and the second state and including one or more correct characters;

deforming the opaque indicator from the first state to the second state;

inserting at least a portion of the opaque indicator into the attachment mechanism of the one or more attachment mechanisms; and allowing the opaque indicator to relax back into the first state such that the opaque indicator covers the one or more characters, such that the one or more characters are not visible through the opaque indicator.

9. The system of claim 8, wherein the transparent color film is a first transparent color film, and the non-transitory computer-readable media further storing computer-executable instructions that, when executed by the one or more processors, cause the robotic mechanism to perform actions comprising:

obtaining a second transparent color film for attachment to the plate over the opaque indicator, the second transparent color film being deformable between the first state and the second state;

deforming the second transparent color film from the first state to the second state;

inserting at least a portion of the second transparent color film into the attachment mechanism of the one or more attachment mechanisms; and allowing the second transparent color film to relax back into the first state such that the second transparent color film covers the one or more correct characters, such that the one or more correct characters are visible through the second transparent color film.

10. The system of claim 7, wherein the plurality of transparent color films are disposed in a magazine stack.

11. The system of claim 7, the non-transitory computer-readable media further storing computer-executable instructions that, when executed by the one or more processors, cause the robotic mechanism to perform actions comprising:

forming the one or more characters onto the front surface of the plate via at least one of laser engraving, printing, etching, or applying an adhesive label.

12. The system of claim 7, the inner cover further comprising a digital display disposed in an opening disposed in the front surface of the plate.

13. One or more non-transitory computer-readable media storing computer-executable instructions that, when executed by one or more processors, cause the one or more processors to perform actions comprising:

obtaining an inner cover for covering an interior of the utility meter, the inner cover comprising:

a plate having a front surface opposite a back surface, one or more characters disposed on the front surface, and one or more attachment mechanisms disposed in or on the front surface;

obtaining a transparent color film for attachment to the plate over the one or more characters, the transparent color film being deformable between a first state and a second state, wherein:

when in the first state the transparent color film has a planar shape, and when in the second state the transparent color film has a curvilinear shape;

deforming the transparent color film from the first state to the second state;

inserting at least a portion of the transparent color film into an attachment mechanism of the one or more attachment mechanisms; and allowing the transparent color film to relax back into the first state such that the transparent color film covers the one or more characters, and such that the one or more characters are visible through the transparent color film.

14. The one or more non-transitory computer-readable media storing computer-executable instructions that, when executed by the one or more processors, causing the one or more processors to perform actions of claim 13, further causing the actions comprising:

removing the transparent color film from the attachment mechanism of the one or more attachment mechanisms;

obtaining an opaque indicator for attachment to the plate over the one or more characters, the opaque indicator being deformable between the first state and the second state and including one or more correct characters;

deforming the opaque indicator from the first state to the second state;

inserting at least a portion of the opaque indicator into the attachment mechanism of the one or more attachment mechanisms;

allowing the opaque indicator to relax back into the first state such that the opaque indicator covers the one or more characters, such that the one or more characters are not visible through the opaque indicator.

15. The one or more non-transitory computer-readable media storing computer-executable instructions that, when executed by the one or more processors, causing the one or more processors to perform actions of claim 14, further causing the actions comprising:

reinstalling the transparent color film over the opaque indicator.

16. The one or more non-transitory computer-readable media storing computer-executable instructions that, when executed by the one or more processors, causing the one or more processors to perform actions of claim 14, wherein the transparent color film is a first transparent color film, and further causing the actions comprising:

obtaining a second transparent color film for attachment to the plate over the opaque indicator, the second transparent color film being deformable between the first state and the second state;

deforming the second transparent color film from the first state to the second state;

inserting at least a portion of the second transparent color film into the attachment mechanism of the one or more attachment mechanisms; and allowing the second transparent color film to relax back into the first state such that the second transparent color film covers the one or more correct characters, such that the one or more correct characters are visible through the second transparent color film.

17. The one or more non-transitory computer-readable media storing computer-executable instructions that, when executed by the one or more processors, causing the one or more processors to perform actions of claim 13, wherein obtaining the inner cover comprises a robotic apparatus picking the inner cover from a plurality of inner covers.

18. The one or more non-transitory computer-readable media storing computer-executable instructions that, when executed by the one or more processors, causing the one or more processors to perform actions of claim 13, wherein obtaining the transparent color film comprises a robotic apparatus picking the transparent color film from a plurality of transparent color films.

* * * * *